United States Patent
Shotey et al.

(10) Patent No.: US 7,402,749 B1
(45) Date of Patent: Jul. 22, 2008

(54) WEATHERPROOF COVER PLATE

(76) Inventors: Marcus J. Shotey, 9677 E. Gold Dust Ave., Scottsdale, AZ (US) 85258; Michael J. Shotey, 10226 Ritornia Ave., Las Vegas, NV (US) 89135

(*) Notice: Subject to any disclaimer, the term of this patent is extended or adjusted under 35 U.S.C. 154(b) by 0 days.

(21) Appl. No.: 11/763,183

(22) Filed: Jun. 14, 2007

Related U.S. Application Data

(63) Continuation of application No. 11/093,458, filed on Mar. 29, 2005, which is a continuation of application No. 10/756,099, filed on Jan. 12, 2004, now Pat. No. 6,894,223, which is a continuation-in-part of application No. 10/128,938, filed on Apr. 23, 2002, now Pat. No. 6,700,063, which is a continuation of application No. 10/015,731, filed on Nov. 1, 2001, now Pat. No. 6,476,321, which is a continuation-in-part of application No. 09/456,089, filed on Dec. 6, 1999, now Pat. No. 6,420,653, which is a continuation of application No. 09/657,352, filed on Sep. 7, 2000, now Pat. No. 6,441,307.

(51) Int. Cl.
*H02G 3/14* (2006.01)

(52) U.S. Cl. .................. 174/66; 174/67; 174/53; 220/241; 220/242

(58) Field of Classification Search .......... 174/53, 174/58, 57, 50, 480, 481, 66, 67; 220/3.2–3.9, 220/4.02, 241, 242; 439/535, 536; D8/353; D13/177
See application file for complete search history.

(56) References Cited

U.S. PATENT DOCUMENTS

| | | | |
|---|---|---|---|
| 1,952,719 A | * | 3/1934 | Lewin .................. 220/3.8 |
| 2,526,606 A | | 10/1950 | Gregg |
| 2,916,733 A | | 12/1959 | Hirsch |
| 3,252,611 A | | 5/1966 | Weitzman et al. |
| 3,432,611 A | | 3/1969 | Gaines et al. |
| 3,437,738 A | | 4/1969 | Wagner |
| 3,438,534 A | | 4/1969 | Zerwes |
| 3,491,327 A | | 1/1970 | Tait et al. |
| 3,518,356 A | | 6/1970 | Friedman |
| 3,530,230 A | | 9/1970 | Cornier et al. |
| 3,544,703 A | | 12/1970 | Jones |
| 3,716,815 A | | 2/1973 | Riches |
| 3,895,179 A | | 7/1975 | Waytt |
| 3,965,287 A | | 6/1976 | Mueller |
| 4,032,030 A | | 6/1977 | Bass et al. |

(Continued)

OTHER PUBLICATIONS

Pass & Seymour, "TradeMaster Weatherproof While-in-Use-Covers", Apr. 1999, Catalog No. WIUC20C.

(Continued)

*Primary Examiner*—Angel R Estrada
(74) *Attorney, Agent, or Firm*—Booth Udall, PLC

(57) ABSTRACT

A weatherproof cover plate is disclosed. A continuous ridge on the base is disclosed in association with a gasket and a biased hinge to provide additional protection against the weather. Particular implementations include an opening in the gasket and the lid. In a weatherproof bubble cover plate, a biased hinge is provided to bias the lid closed upon the base. Additionally, one or more cord catches in the base and knockouts in the lid are disclosed. Other embodiments include bubble cover plates having gaps between the lid and the base to allow a cord to pass therethrough when the lid is close.

22 Claims, 19 Drawing Sheets

U.S. PATENT DOCUMENTS

| | | |
|---|---|---|
| 4,197,959 A | 4/1980 | Kramer |
| 4,342,493 A | 8/1982 | Grenell |
| 4,424,407 A | 1/1984 | Barbic |
| 4,500,746 A | 2/1985 | Meehan |
| 4,705,335 A | 11/1987 | Goebel |
| 4,737,599 A | 4/1988 | Fontaine |
| 4,757,908 A | 7/1988 | Medlin, Sr. |
| 4,833,277 A | 5/1989 | Jacoby, Jr. et al. |
| 4,844,275 A | 7/1989 | Schnell et al. |
| 4,979,634 A | 12/1990 | Begley |
| 4,998,635 A | 3/1991 | Vink et al. |
| 5,072,848 A | 12/1991 | Pipis et al. |
| 5,178,350 A | 1/1993 | Vink et al. |
| 5,218,169 A | 6/1993 | Riceman |
| 5,280,135 A | 1/1994 | Berlin et al. |
| 5,317,108 A * | 5/1994 | Prairie, Jr. .................... 174/67 |
| 5,362,924 A | 11/1994 | Correnti |
| 5,527,993 A | 6/1996 | Shotey et al. |
| 5,763,831 A | 6/1998 | Shotey et al. |
| 6,133,531 A * | 10/2000 | Hayduke et al. ............... 174/67 |
| 6,160,219 A | 12/2000 | Maltby et al. |
| 6,476,321 B1 | 11/2002 | Shotey et al. |

OTHER PUBLICATIONS

34 UL 514 C-38, Dec. 26, 1996, pp. 34-55.

* cited by examiner

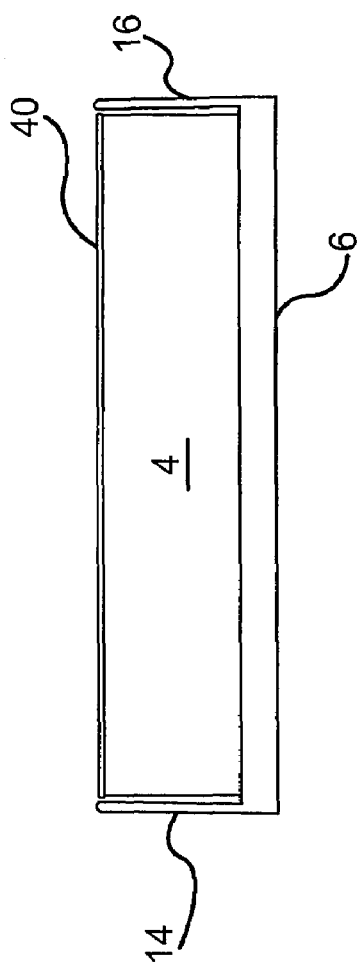
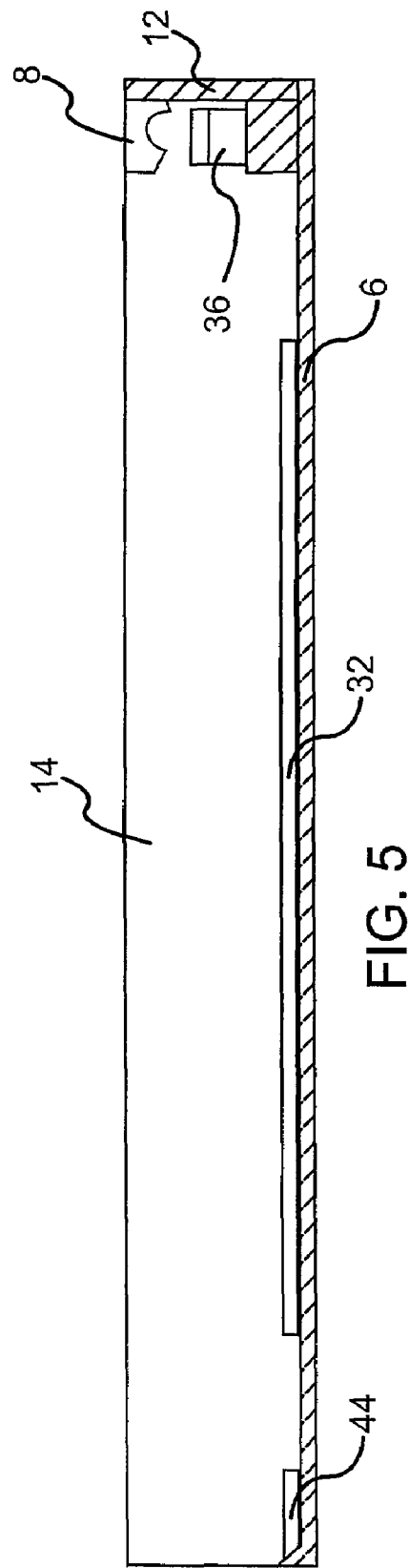

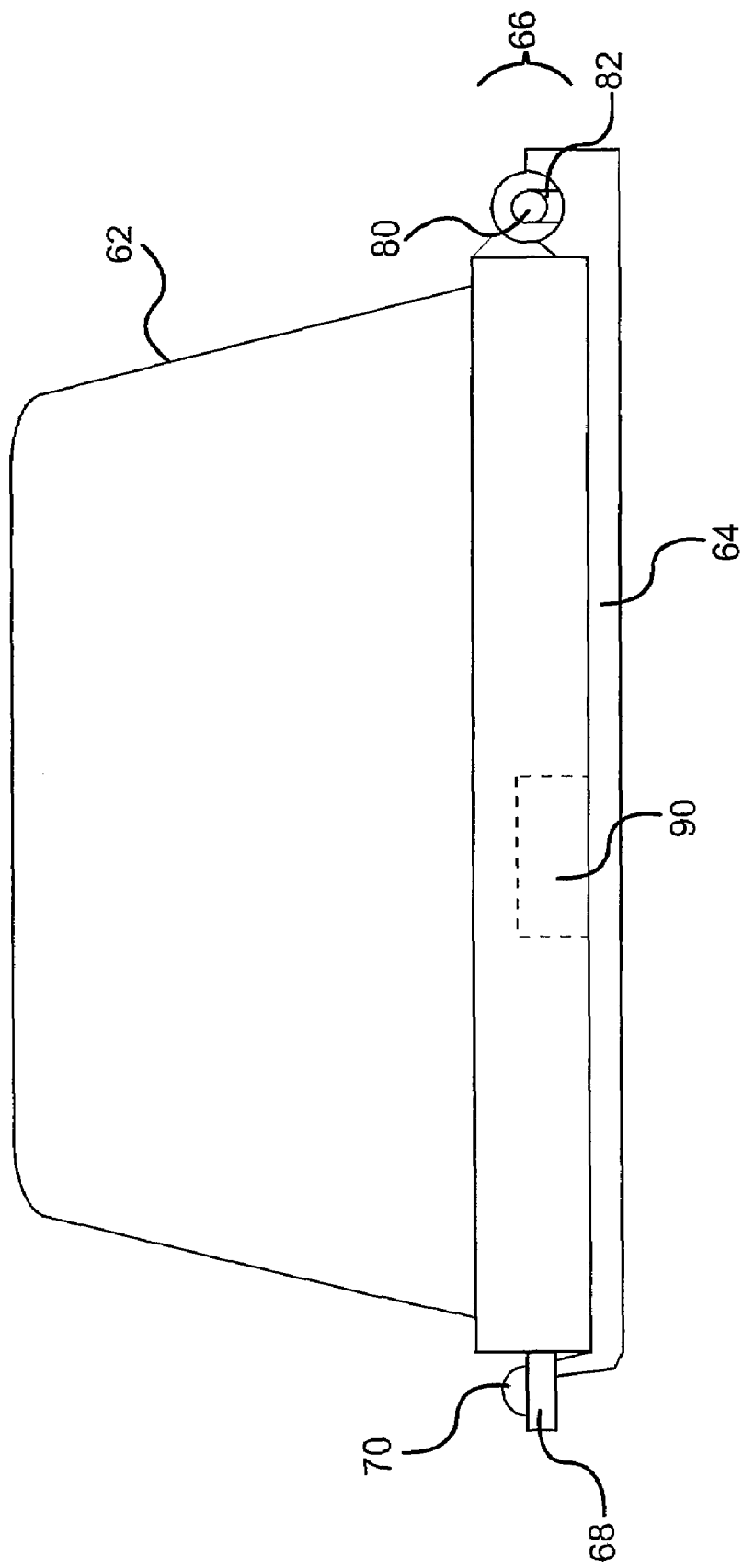

WEATHERPROOF COVER PLATE

RELATED APPLICATION

This application is a continuation application of the earlier patent application by Shotey et al. entitled "Horizontal and Vertical Mountable Weatherproof Cover Plate," Ser. No. 11/093,458, filed Mar. 29, 2005, which is a continuation of the earlier patent application by Shotey et al. entitled "Horizontal and Vertical Mountable Weatherproof Cover Plate," Ser. No. 10/756,099, filed Jan. 12, 2004, which issued as U.S. Pat. No. 6,894,223 on May 17, 2005, which is a continuation-in-part application of the earlier patent application by Shotey et al. entitled "Horizontal and Vertical Mountable Weatherproof Cover Plate," Ser. No. 10/128,938, filed Apr. 23, 2002, which issued as U.S. Pat. No. 6,700,063 on Mar. 2, 2004 which application is a continuation application of the earlier patent application by Shotey et al. entitled "Horizontal and Vertical Mountable Weatherproof Cover Plate," Ser. No. 10/015,731, filed Nov. 1, 2001, which issued as U.S. Pat. No. 6,476,321 on Nov. 5, 2002, which application is a continuation-in-part of the earlier patent application by Shotey et al. entitled "Base for Electrical Outlet and Related Method," Ser. No. 09/456,089, filed Dec. 6, 1999, which application issued on Jul. 16, 2002 as U.S. Pat. No. 6,420,653, and of the earlier patent application by Shotey et al. entitled "Universal Cover Plate," Ser. No. 09/657,352, filed Sep. 7, 2000, which application issued on Aug. 27, 2002 as U.S. Pat. No. 6,441,307, the disclosures of which are hereby incorporated herein by reference.

BACKGROUND OF THE INVENTION

1. Technical Field

This invention generally relates to electrical outlets and, more particularly, to a weatherproof cover plate for an electrical outlet configured to be mountable in both horizontal and vertical orientations by providing a biased hinge and weatherproofing features.

2. Background Art

Cover plates for electrical devices have been used extensively for many years. The general construction, operation and usefulness of cover plates are well known in the art. Cover plates are generally categorized as either flat cover plates or bubble cover plates. Several examples of cover plates are shown and described in U.S. Pat. Nos. 5,763,831 to Shotey et al. (Jun. 9, 1998) and 5,527,993 to Shotey et al., the disclosures of which are hereby incorporated herein by reference. Varieties of each of these two styles of cover plates are known to be made weatherproof by manufacturers for use outside or in extreme conditions. Weatherproof cover plates, as they are known in the art and approved by the Underwriters Laboratories ("UL"), are cover plates for electrical devices or outlets which self close when mounted and, when closed, resist water from reaching the electrical device or outlet protected by the cover plate sufficient to meet and pass the testing standards established by UL. Weatherproof cover plates are conventionally designed and sold for either horizontal or vertical mounting, and not for both. This requires cover plate installers and suppliers to maintain stock of both horizontal and vertical weatherproof cover plates.

Conventional bubble cover plates are designed so that the weight of the cover plate lid closes the lid against the base of the cover plate. Accordingly, bubble cover plates are designed and installed so that the hinges for the lid are along the upper edge of the cover plate when mounted so that gravity pulls the lid shut in compliance with the UL standard. For additional weatherproofing protection, a portion of the lid of a bubble cover plate is conventionally sized and shaped to overlap a portion of the base.

Conventional flat cover plates comprise a base for mounting to an outlet box, a lid hingedly mounted to the base, and a gasket associated with the lid so that when the lid is closed against the base, the gasket contacts the base to resist water flow to the electrical components under the lid. For flat cover plates, because the lids are generally smaller and of lighter weight than those of bubble cover plate lids which are closed by gravity, and because the thin profile of a flat cover plate is less conducive to a latch, some form of a spring or other biasing device is used to force the lid closed to press and maintain the gasket against the base. Without the spring, the lighter lids are subject to being blown open by the wind or to remaining slightly open thereby exposing the electrical outlet to the weather. Again, however, because UL requires that the lid keep water from the electrical outlet protected by the cover plate, flat cover plates are conventionally designed and approved to be installed either horizontally or vertically and not both.

Thus, there is a need for both a weatherproof flat cover plate and a weatherproof bubble cover plate in the art that is approved for and may be installed both horizontally and vertically.

DISCLOSURE OF THE INVENTION

The present invention relates to embodiments of weatherproof cover plates that are installable in both the horizontal and vertical orientations. For embodiments of a weatherproof flat cover plate, an apron is disclosed which extends from at least two sides of the flat cover plate base to reflect water thereon from the base. For additional protection against the weather, the apron may be angled with respect to the base, a continuous ridge may extend above the base, and the lid may include a gasket and a biased hinge so that the biased hinge presses the gasket against the continuous ridge to create a barrier against water passing over the ridge. A removable locking clip that secures itself to the base may be used to assist in securing the lid against the base. For embodiments of a weatherproof bubble cover plate, a biased hinge is used to bias the lid closed upon the base. Embodiments of the bubble cover plate also include one or more cord catches in the base and knockouts in the lid to accommodate a cord attached to an electrical device or outlet within the cover plate to extend to outside the cover plate. Alternate embodiments of the cover plate also include one or more gaps between the base and the lid to allow a cord to extend from inside the cover plate to outside the cover plate without preventing the lid from closing.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 2 is an end view of the flat cover plate of FIG. 1 as seen along view lines 2-2 of FIG. 1;

FIG. 5 is a view of the base of the embodiment of FIG. 1 as seen along view lines 5-5 of FIG. 4;

FIG. 16 is an assembled side view of the cover plate of FIG. 9;

DETAILED DESCRIPTION OF EMBODIMENTS OF THE INVENTION

Figure 1:
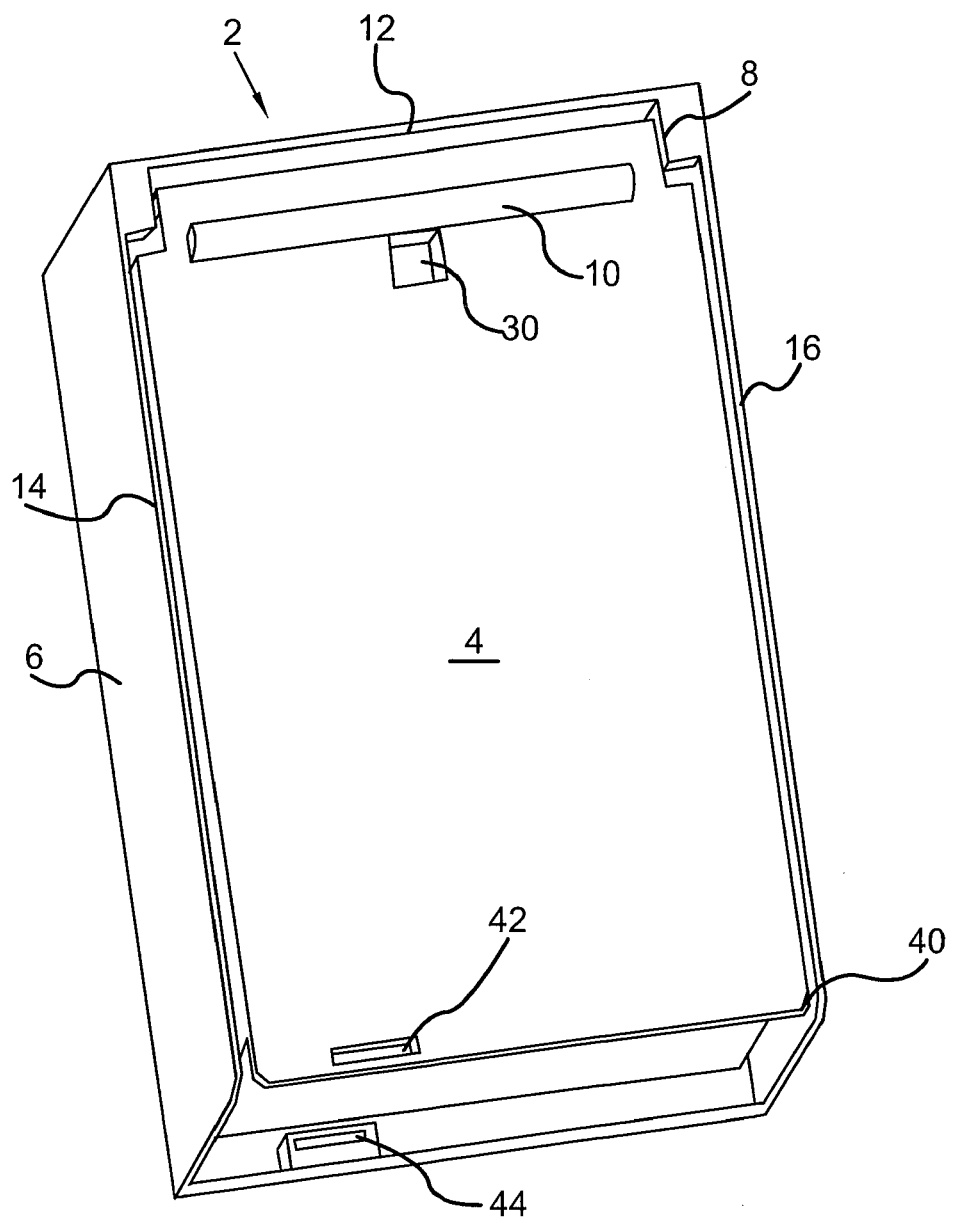
FIG. 1 is a perspective view of a flat cover plate configured according to an embodiment of the invention.

As discussed above, embodiments of the present invention relate to weatherproof cover plates that may be selectively mounted in both the horizontal and vertical orientations. Referring to FIGS. 1-5, illustrating an embodiment of a flat weatherproof cover plate 2, the flat cover plate 2 generally includes a lid 4 and a base 6. The lid 4 is hingedly coupled to the base 6 by a biased hinge 8 in this embodiment, though a biased hinge is not required in all embodiments. The biased hinge 8 continuously biases the lid 4 into a closed position such as is shown in FIG. 1 using biasing elements 36 best shown in FIGS. 3-5. The lid 4 includes a stop 10 for preventing the lid 4 from opening beyond a desired angle by coming in contact with a first side 12 of the base 6 when the lid 4 is in an open position. As will be clear to one of ordinary skill in the art, the particular configuration and structure of the biased hinge is not crucial to the invention and any of the many hinge configurations known in the art combined with a biasing device, such as a coil spring, band spring, elastic member pulling the lid shut, and the like, are sufficient to practice the invention.

In the embodiment of the flat cover 2 shown in FIGS. 1-5, an apron extends from the base 6 along three sides 12, 14 and 16. The apron in this embodiment does not include any openings therein which would allow water to flow into the base. The apron, as shown in FIG. 2, may be configured to angle toward the lid 4 slightly to cause any water on the apron to flow away from the base 6 when the cover plate 2 is mounted to a box. By only slightly angling the apron toward the lid, water may flow from the apron, but the lid 4 can still close against the base 6 while being seated within the apron. An angle of between 1 and 15 degrees is sufficient. It is contemplated that in embodiments of the invention, the apron will be included along only two adjacent sides of the base 6. By including the additional weather protection provided by an apron on two adjacent sides, the cover plate 2 may still be installed in both a vertical and a horizontal orientation and have an apron along an upper edge of the installed cover plate.

Figure 3:
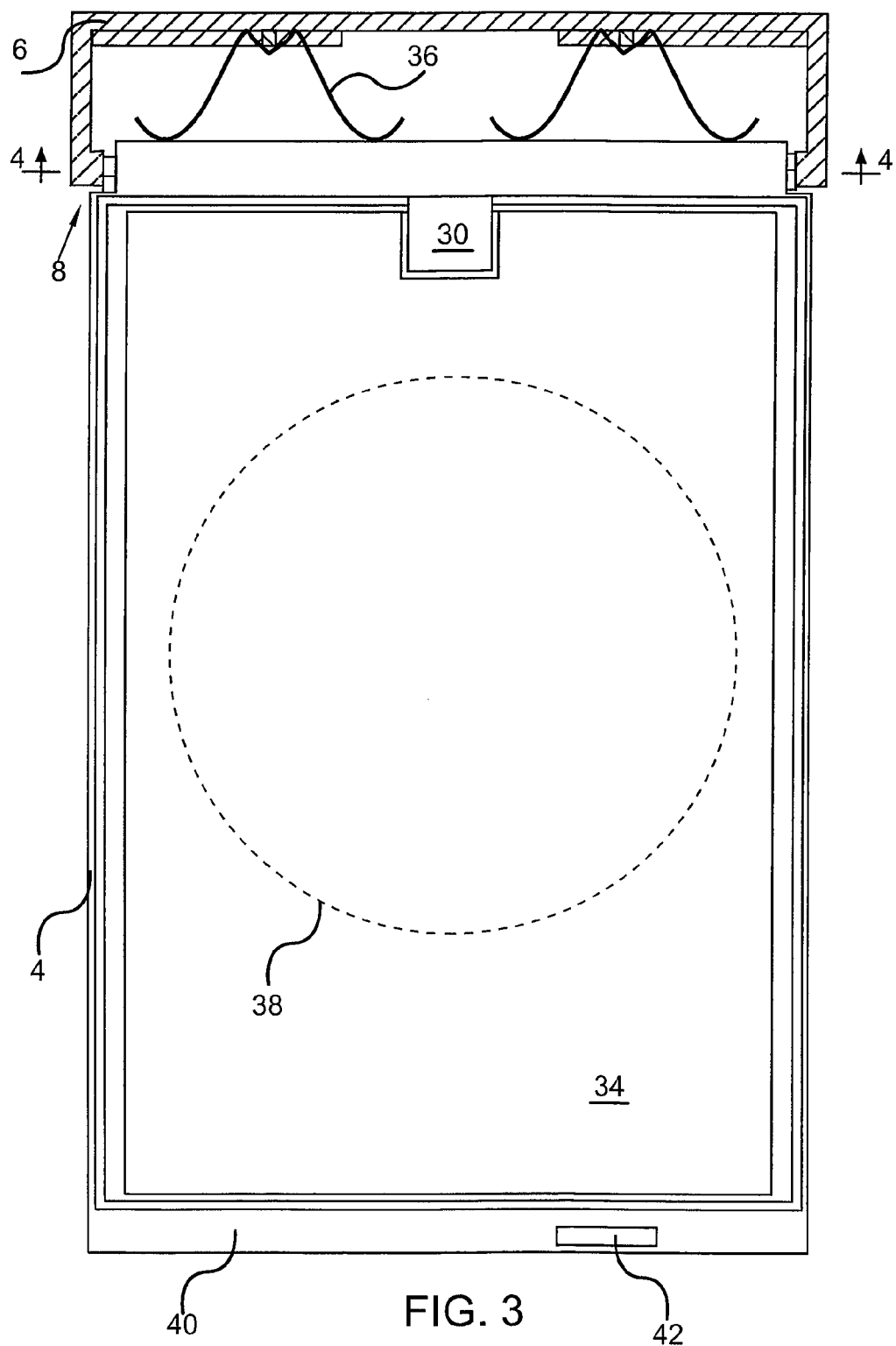
FIG. 3 is a view of the flat cover plate embodiment of FIG. 1 as seen with the lid open when viewed along lines 3-3 of FIG. 4.
Figure 4:
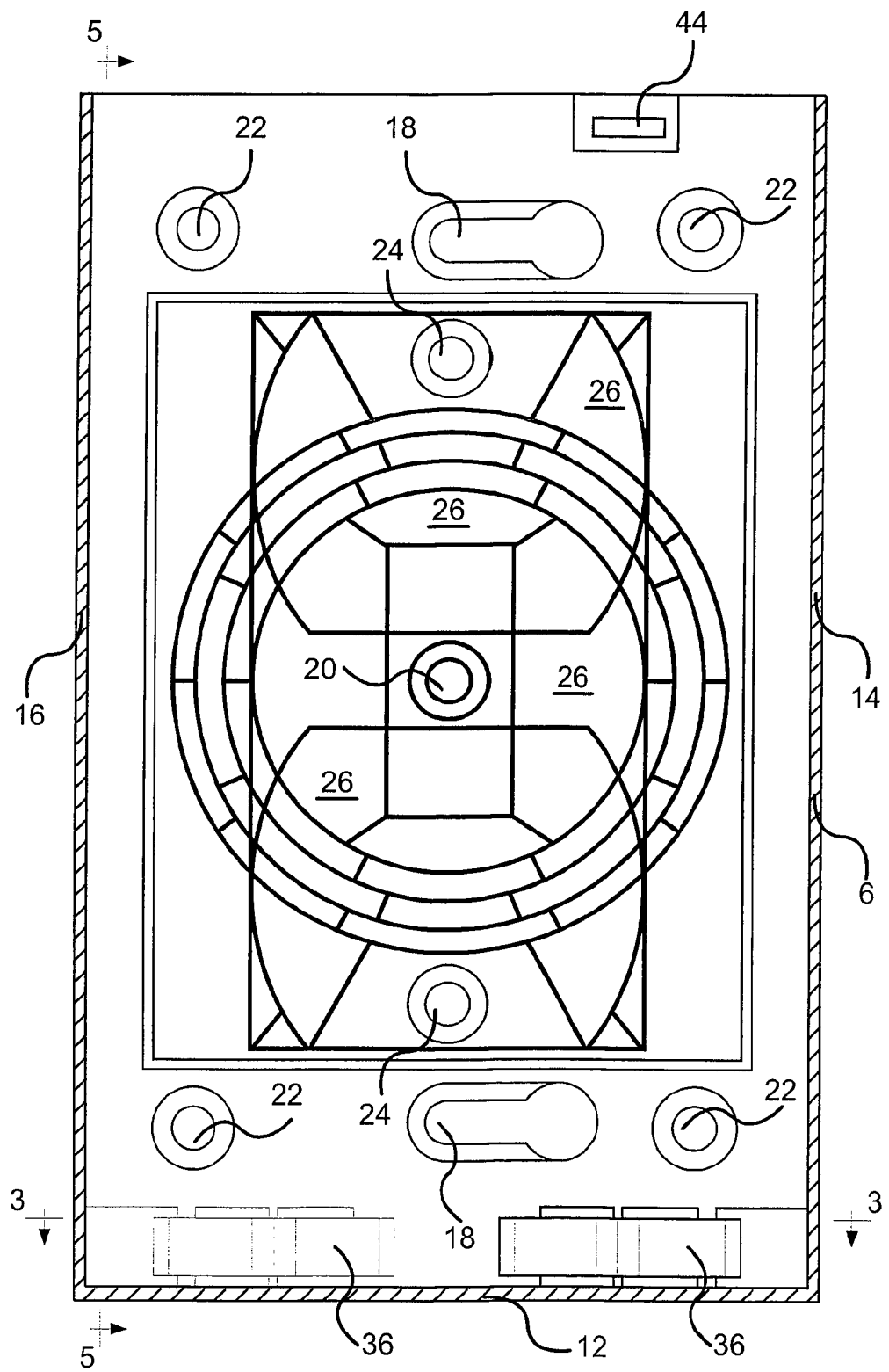
FIG. 4 is a view of the inside of the base of the embodiment of FIG. 1 as seen along view lines 4-4 of FIG. 3.

As shown in FIG. 4, which illustrates the base 6 of the cover plate 2 as viewed along line 4-4 of FIG. 3, the base 6 of the illustrated embodiment of the invention includes a plurality of mounting screw apertures 18, 20, 22 and 24 for alternatively mounting the cover plate 2 to a plurality of different configurations of electrical boxes for applying the cover plate 2 to a wider variety of electrical outlets and devices. Knock-out elements 26 in the base may be selectively removed in the present embodiment shown in FIG. 4 to adaptively receive a duplex outlet, a ground fault circuit interrupt (GFCI) outlet, a plurality of round outlet sizes, and a single pole double throw switch. The manipulation and function of the knock-out elements 26 is more fully shown and described in the previous patent application Ser. No. 09/657,352 entitled "Universal Cover Plate", the disclosure of which was previously incorporated herein by reference. By coupling the versatility of applying this cover plate to a wide variety of outlets with the ability to mount this outlet in both the vertical and horizontal orientations and still meet the UL testing standards for weatherproof safety, this single cover plate may be used in place of an even wider variety of weatherproof cover plates presently used in the art.

As is also shown in FIG. 4, the base of the present invention may include keyhole mounting screw holes or "slots" 18 to simplify installing of the cover plate. Each keyhole slot 18 includes a first aperture large enough for a screw head to pass through, and a second aperture having a diameter smaller than a screw head. The second aperture is aligned with a mounting screw hole in an electrical box. The use and function of keyhole slot apertures with electrical outlet bases is more fully shown and described in the previous patent application Ser. No. 09/456,089 entitled "Base for Electrical Outlet and Related Method," the disclosure of which was previously incorporated herein by reference. While the embodiment of the invention shown in FIG. 4 shows the keyholes slots 18 in a location for aligning with the electrical box screws of a duplex outlet, it is contemplated that any of the other mounting screw holes may be substituted with a keyhole slot for use with embodiments of the present invention.

Another feature of the embodiment of the invention shown in FIGS. 1-5 for simplifying installation of all cover plates, and particularly biased hinge cover plates, is the opening 30 in the lid 4 shown best in FIGS. 1 and 3. In conventional installation of biased hinge cover plates, it is particularly difficult to align the base with the electrical box and screw the box mounting screw through the base mounting screw aperture closest the biased hinge while the biased hinge is forcing the lid closed. This is particularly difficult for duplex weatherproof outlets. By providing openings 30 in the lid 4 of a cover plate 2 which each align with a box mounting screw aperture 18 in the base 6, the lid may be closed for all or a portion of the mounting of the base 6 to the electrical box.

The opening 30 in the lid 4 may be configured large enough to insert the screw threads and head without opening the lid, or may be sized such that the screw may be started with the lid open, and tightened with the lid closed. Furthermore, this opening 30 is particularly useful when combined with the use of a keyhole slots 18. For example, to install the cover plate 2 shown in FIGS. 1-5, a box mounting screw may be started into an electrical box and tightened to a point where only a portion of the screw threads are not inserted into the box mounting screw hole. Thereafter, the keyhole slots 18 may be placed over the box mounting screws and slid into place so that the second, smaller aperture of each of the keyhole slots 18 is aligned with the box mounting screw head. With the lid closed, the box mounting screw closest to the hinge 8 may be tightened through opening 30 in the lid 4. If a second opening is not provided for the box mounting screw farthest from the hinge 8, the lid may then be opened to partially tighten that screw. Because it is most difficult to tighten the box mounting screw closest to the hinge 8, it is most useful to have an opening 30 aligned with the mounting screw aperture in the base corresponding to that screw. However, embodiments of the invention may include openings for any or all of the mounting screw apertures in the base.

The use of keyhole slots 18 for installing a weatherproof cover plate is particularly useful because the lid of the weatherproof cover plate tends to interfere with inserting the screws into the box screw holes through the base. By providing keyhole slots 18 in the base, whether or not the lid includes openings 30 therethrough for accessing the mounting screw apertures 18, the mounting screws may be partially mounted onto an outlet box and then the cover plate can be placed on the outlet box without struggling with the lid while starting in the mounting screws into the appropriate holes in the electrical box. Once the screws are started into the electrical box, it is much easier to finish screwing them in despite interference with the lid. The mounting screws can be completely tightened from inside the lid, or through an opening 30 in the lid.

For the particular embodiment shown in FIGS. 1-5, a continuous ridge 32 extends from the base 6 surrounding the portion of the base through which the outlet will extend when the base 6 is installed on an electrical box. The ridge 32 of the present embodiment is approximately 2 mm high, though taller and shorter ridges are contemplated and may be required depending upon the strength of the bias in closing the lid and other characteristics which will be clear to those of ordinary skill in the art from this disclosure. The continuous ridge 32 provides an additional weatherproof feature of the present embodiment in conjunction with a gasket 34 associated with the lid 4. When the lid 4 is pressed closed by the biasing hinge 8, the gasket 34 presses against the continuous ridge 32 extending from the base 6 to resist water flow thereacross. By placing the ridge 32 inwardly of some of the box mounting holes 18 and 22, the ridge and gasket combination also provides additional protection to isolate the outlet openings from the box mounting holes 18 and 22 and prevent water from seeping through those holes 18 and 22 into the electrical workings of the box while the lid is closed. When the cover plate 2 is mounted to an electrical box, the mounting holes 20 and 24 within the ridge are each either filled with a screw or are in communication with the electrical box and, therefore, will not pose a threat of water seeping therethrough to the electrical devices protected by the cover plate 2.

Figure 20:
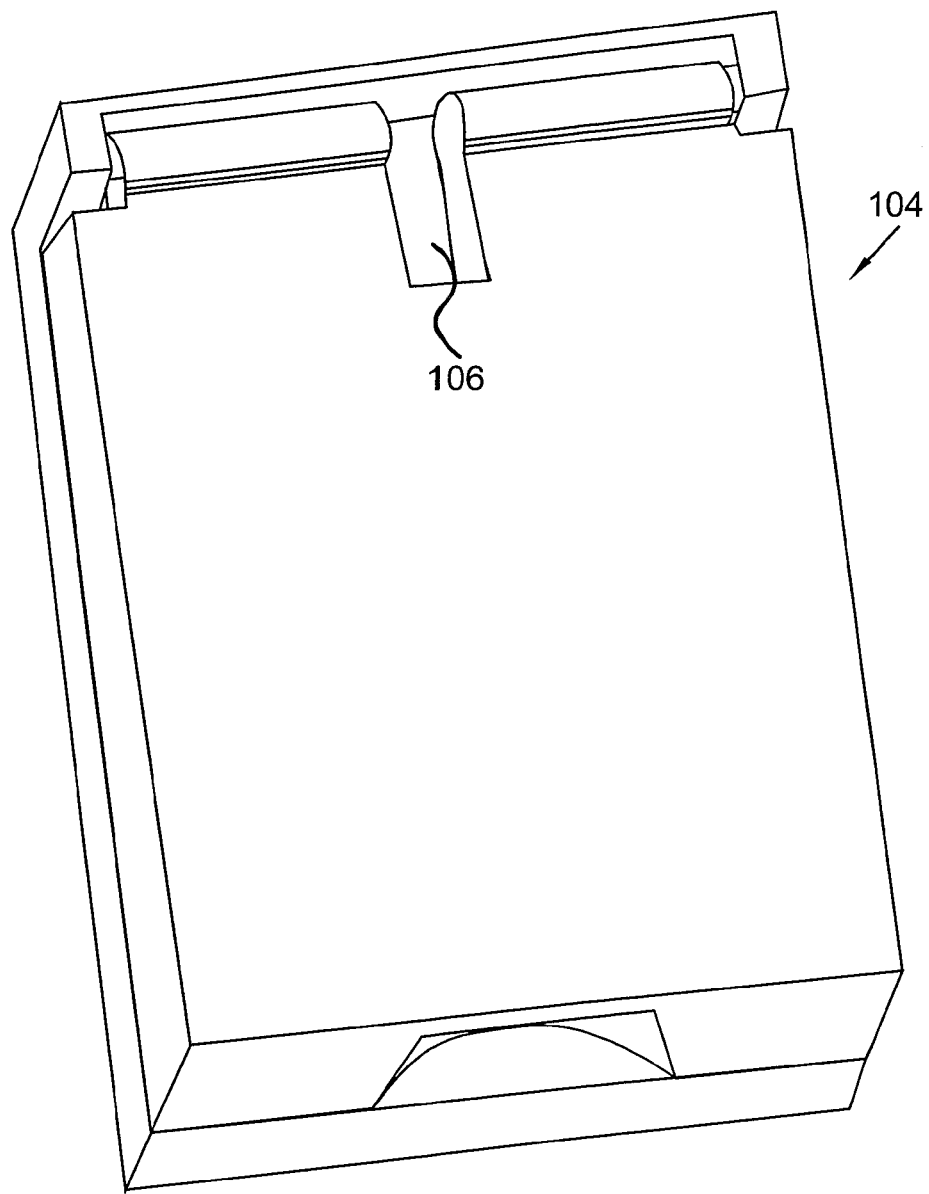
FIG. 20 is a perspective view of a flat weatherproof cover plate without an apron.
Figure 21:
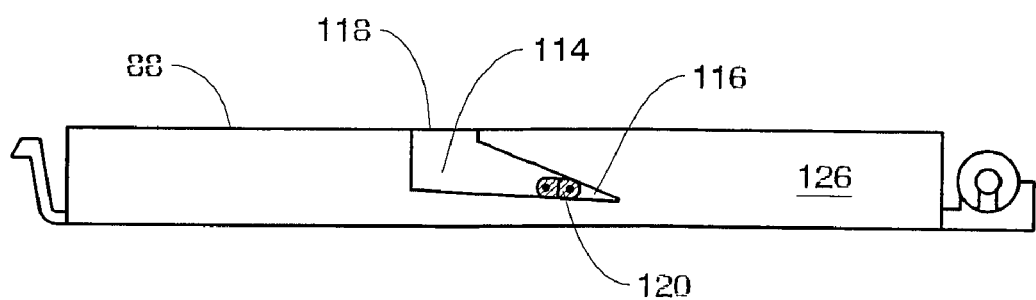
FIG. 21 is a side view of a first embodiment of a pinching cord catch in a cover plate base.
Figure 22:
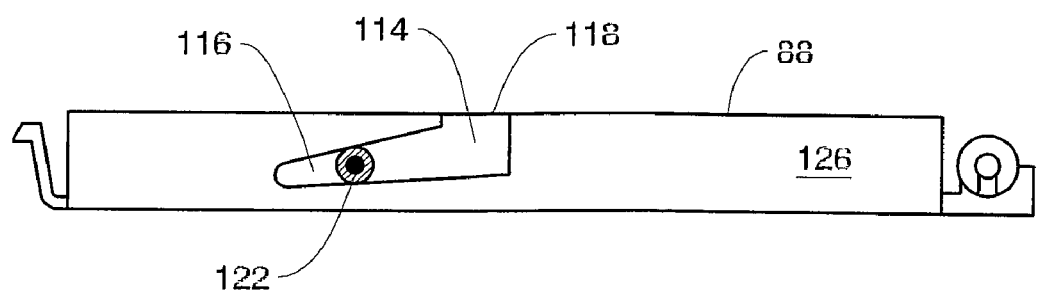
FIG. 22 is a side view of a second embodiment of a pinching cord catch in a cover plate base.

The thickness and resilience of the gasket 34 in the lid 4 and the bias elements 36 in the hinge 18, and the height of the ridge 32 determine how effectively the ridge and gasket combination keeps water from crossing the barrier formed when the lid 4 is in its closed position against the base. It is also contemplated that in particular embodiments of the invention, such as the embodiment of a cover plate 104 shown in FIG. 20, the apron extending from the base 6 will not be necessary to reflect water from the base in a weatherproof horizontal and vertical mountable cover plate because the ridge and gasket combination provides a sufficient barrier to water flow. Note that the opening 106 in the lid of the embodiment shown in FIG. 20 extends to an edge of the lid. So long as the opening 106 is placed outside the ridge and gasket seal, water does not pass to the electrical outlet or device protected by the lid. The gasket 34 may also include punch-out sections, such as the round punch-out section indicated by dashed line 38 in FIG. 3, to accommodate electrical devices which extend through the base farther than the ridge and may cause interference to the lid 4 closing.

Figure 6:
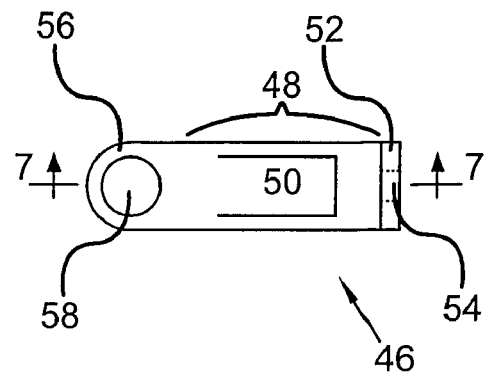
FIG. 6 is a front view of a locking clip configured according to an embodiment of the present invention.
Figure 7:
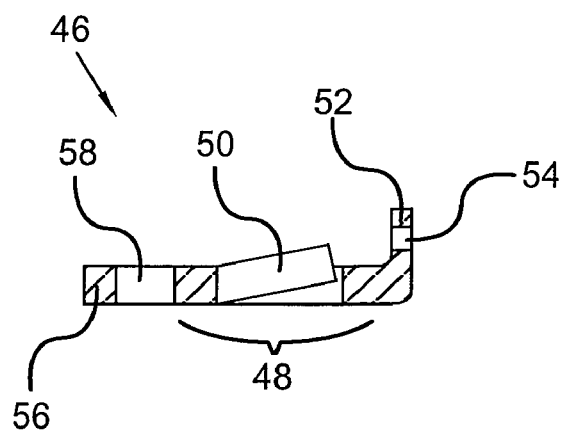
FIG. 7 is a cutaway side view of the clip of FIG. 6 as seen along view lines 7-7 of FIG. 6.

In particular embodiments of the invention, the lid 4 may also include an extension 40 to provide a handle by which the lid 4 may be more easily opened. The embodiment of the invention shown in FIGS. 1-5 also includes a locking clip aperture 42 in the lid 4 and a corresponding and aligned locking clip aperture 44 in the base 6. A novel locking clip 46 is disclosed in FIGS. 6-8 which includes an elongated body portion 48 having a raised latching section 50, a restraining end 52 having an aperture 54 therethrough, and a locking end 56 having a locking aperture 58 through which a padlock, locking pin, or other mechanism may be used to secure the lid to the base. Aperture 54 is not required for the general operation of the clip.

Figure 8:
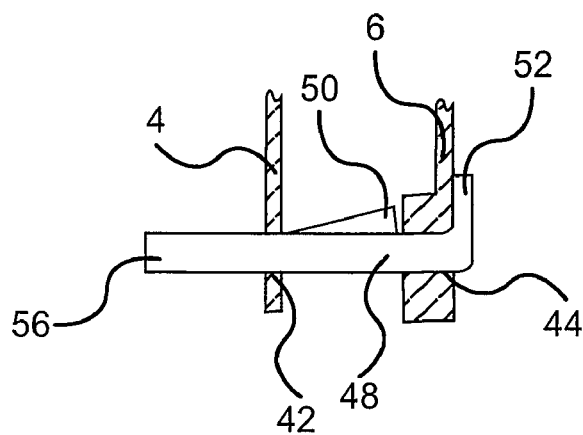
FIG. 8 is side view of the clip of FIG. 6 shown coupled to a lid and base of a flat cover plate.

To install the locking clip 46, the locking end 56 is inserted into the locking clip aperture 44 in the base 6 and then through the locking clip aperture 42 in the lid 4 so that the elongated body portion 48 of the locking clip 46 extends through both locking clip apertures 42 and 44. The raised latching section 50 is flexibly coupled to the elongated body portion 48 such that when the elongated body portion is inserted into the locking clip apertures 42 and 44, the raised latching section 50 flexes into alignment with the remainder of the elongated body portion 48 until it completely passes through the locking clip aperture 44 in the base. As shown in FIG. 8, once the raised portion 50 passes through the locking clip aperture 44 in the base, it returns to its original position to prevent the locking clip 46 from slipping back out of the locking clip aperture 44. The restraining end 52 of the locking clip 46 prevents the locking clip 46 from completely passing through the locking clip aperture 44 by coming into contact with the base 6. The restraining end 52 may be oriented either toward the edge of the base 6, or toward the center with equal effectiveness. If directed toward the edge of the base 6, the aperture 54 in the restraining end may be used to assist in locking the lid 4 to the base 6.

In particular embodiments of the locking clip 46, the elongated body portion 48 is provided with the length needed for the locking end 56 of the locking clip 46 to extend beyond the lid 4 and allow the lid to be locked through the locking aperture 58 with a padlock, pin or other locking mechanism, but not so long as to prevent the lid 4 from opening when the locking clip is in place. To remove the locking clip 46 from the cover plate, an operator may press or squeeze the raised portion 50 back into alignment with the elongated body portion 48 and draw the locking clip 46 back through the locking clip apertures 42 and 44 in the lid 4 and base 6.

The locking clip may be formed of any resilient plastic or metal which is pliable enough to allow for the operation of the resilient member without breaking. For example, when made of plastic, the locking clip may be formed by a plastic extrusion or molding process. Alternatively, a plastic locking clip may be die cut from a sheet of plastic, heated and shaped accordingly. A die cut and shaping process may form a metal clip, for example. Methods and materials for forming appropriate resilient plastic and metal members that meet the requirements of this invention are known in the art and will be clear to those of ordinary skill in the art.

Figure 9:
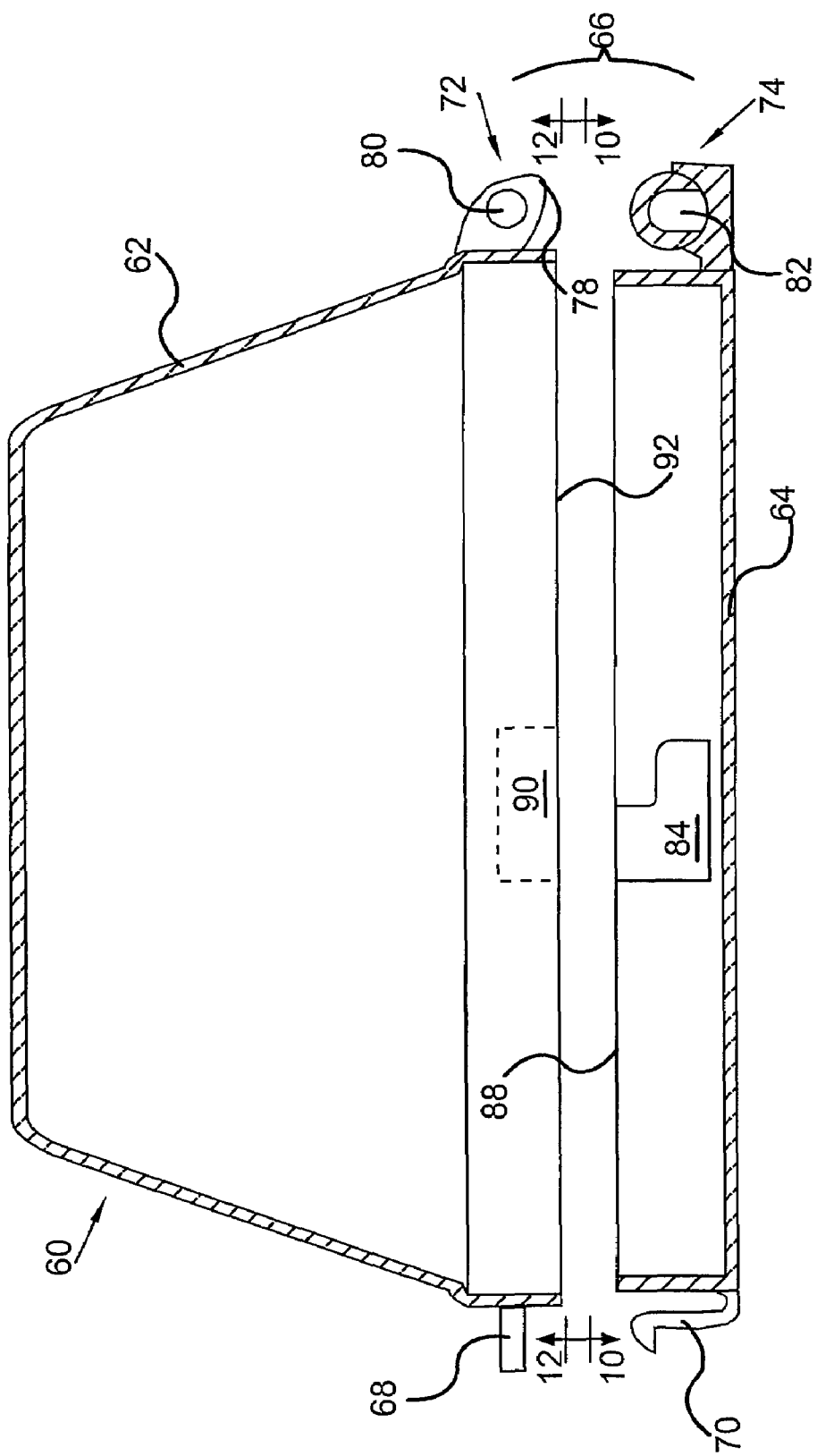
FIG. 9 is a side view of a separated lid and base of a bubble cover plate configured according to an embodiment of the invention.

FIGS. 9-16 illustrate an embodiment of a weatherproof bubble cover plate 60 which is mountable in both horizontal and vertical orientations. The bubble cover plate 60 includes a lid 62 and a base 64 ordinarily coupled by a biased hinge 66 as shown in FIG. 16. The biased hinge 66 of FIG. 9 is shown uncoupled for clarity. Conventional weatherproof bubble cover plates do not have biased hinges because the lids of conventional weatherproof bubble cover plates are generally approved only for and are installed only in an orientation with the hinge at the top and the lid is sufficiently heavy to close the lid. Conventional bubble cover plates often also include clasp members, such as clasp members 68 and 70, to clasp the bubble cover closed when the weight of the lid forces it shut. For embodiments of the invention that include a biased hinge 66, clasp members 68 and 70 may be included for additional assurance that the lid 62 will remain closed against the base 64, but are not needed to maintain the lid 62 closed in a weatherproof manner.

Figure 10:
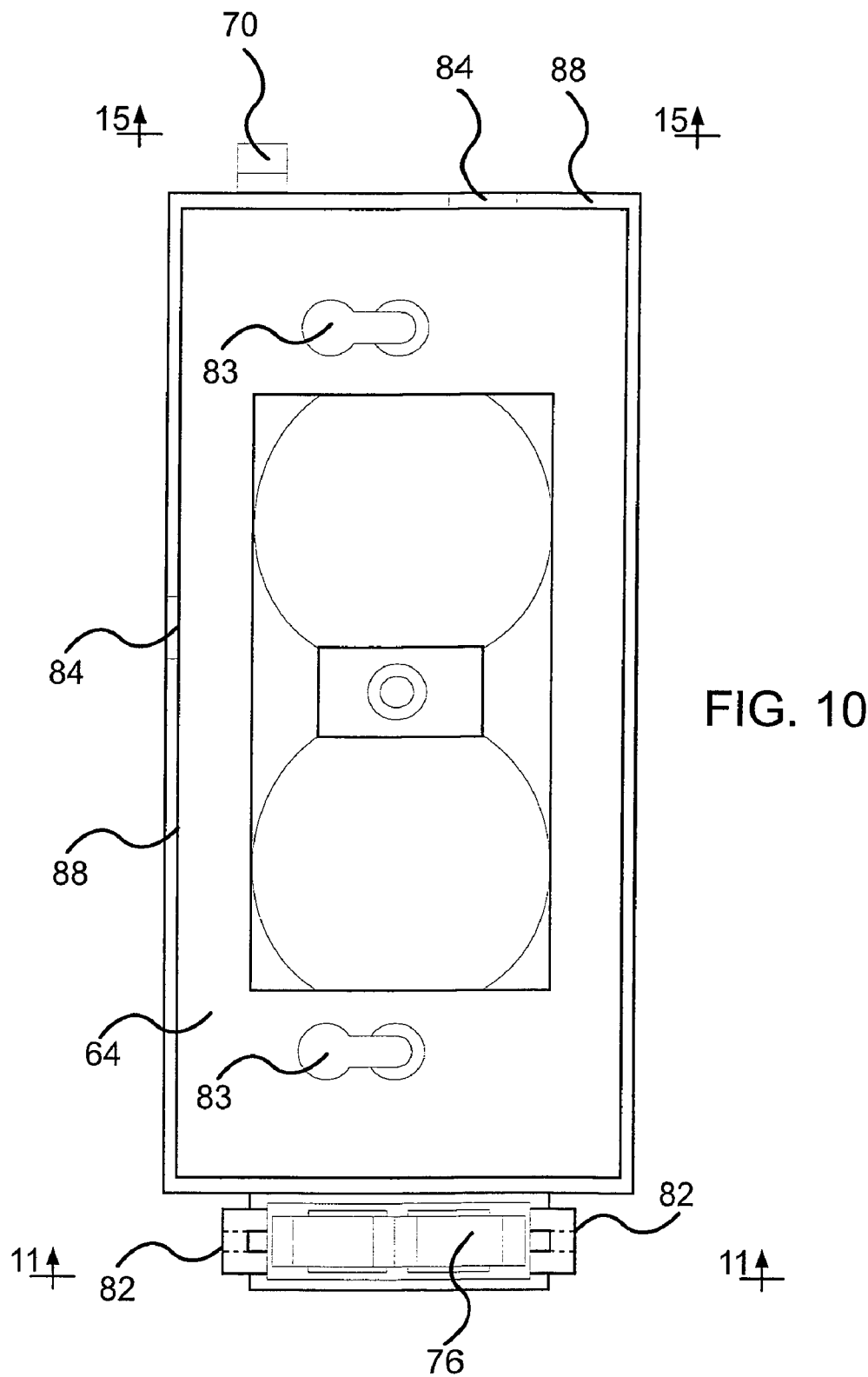
FIG. 10 is a top view of the base of FIG. 9 as seen along view lines 10-10 of FIG. 9.
Figure 11:
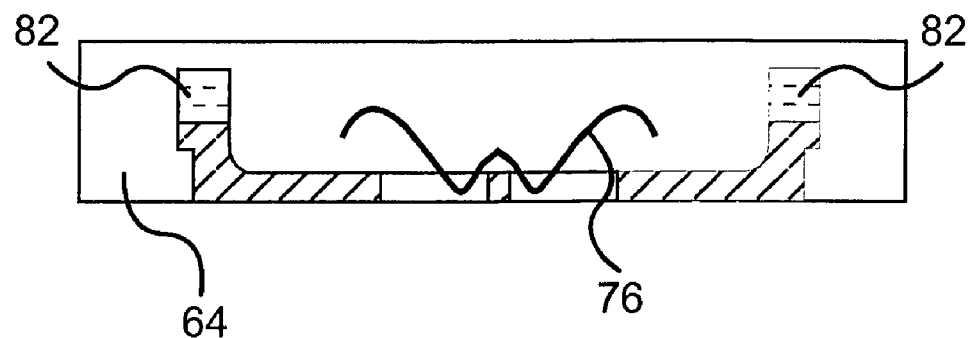
FIG. 11 is an end view of the base of FIG. 10 as seen along view lines 11-11 of FIG. 10.

The biased hinge 66 of the bubble cover plate 60 embodiments shown in FIGS. 9-16 includes lid hinge elements 72 and base hinge elements 74. As best illustrated in FIGS. 10 and 11, similar to the hinge bias elements 36 of the embodiment shown in FIGS. 3 and 4, the hinge bias element 76 of the bubble cover plate 60 biases the hinge bias bar 78 of the lid hinge elements 72 causing the lid to pivot about an axis through the hinge pivots 80 when the hinge pivots 80 are seated in the base pivot seats 82. Because the lid 62 of the bubble cover plate 60 is larger and often heavier than that of a flat cover, it may be necessary to use a stronger bias element 76 to close the lid 62 in a horizontal orientation. The specific strength of the spring necessary to close the lid in a horizontal orientation may be readily determined by one of ordinary skill in the art for the specific design of a particular cover plate. Additionally, while only a single bias element 76 is shown for the embodiment of FIGS. 9-16, it should be understood that additional or alternative bias elements may be used for a particular application. Some of these were set forth in the prior description of possible biasing elements of the flat weather weatherproof cover plate.

Also similar to the embodiment of the flat cover plate shown in FIGS. 1-5, the base 64 of the bubble cover plate 60 includes mounting screw apertures configured as keyhole slots 84, and apertures and knock-outs for adapting the base 64 for either a duplex outlet or a GFCI outlet. It will be understood by those of ordinary skill in the art that for embodiments of either the flat or bubble covers the bases may be configured for use with a single type of outlet or device, or may be configured for use with a plurality of outlets or devices depending upon the desired application. The embodiments shown should not be construed to limit the application of the novel principles of the invention to particular types of outlets or devices.

The base 64 of the bubble cover plate 60 further includes a cord catch 86 positioned along an upper lip 88, or ridge of the base structure 64 so that a cord may be placed in the cord catch 86 to allow the cord to be plugged into a receptacle or otherwise attached to an electronic device installed within the cover plate 60 when the lid is closed. For stiff cords that do not bend easily when confronted with the lid closing, a knock-out tab 90 may be positioned along a lip 92, or ridge of the lid 62. In particular embodiments of the invention, the knock-out tab 90 covers the cord catch 86 when the lid is in its closed position (see FIG. 16). This allows the cover to remain weatherproof for various installed orientations of the cover plate.

Figure 15:
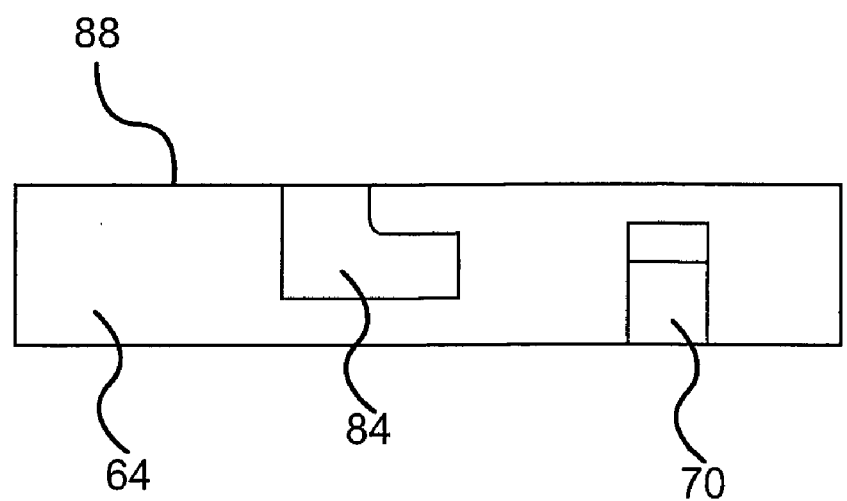
FIG. 15 is an end view of the base of FIG. 10 as seen along view lines 15-15 of FIG. 10.
Figure 12:
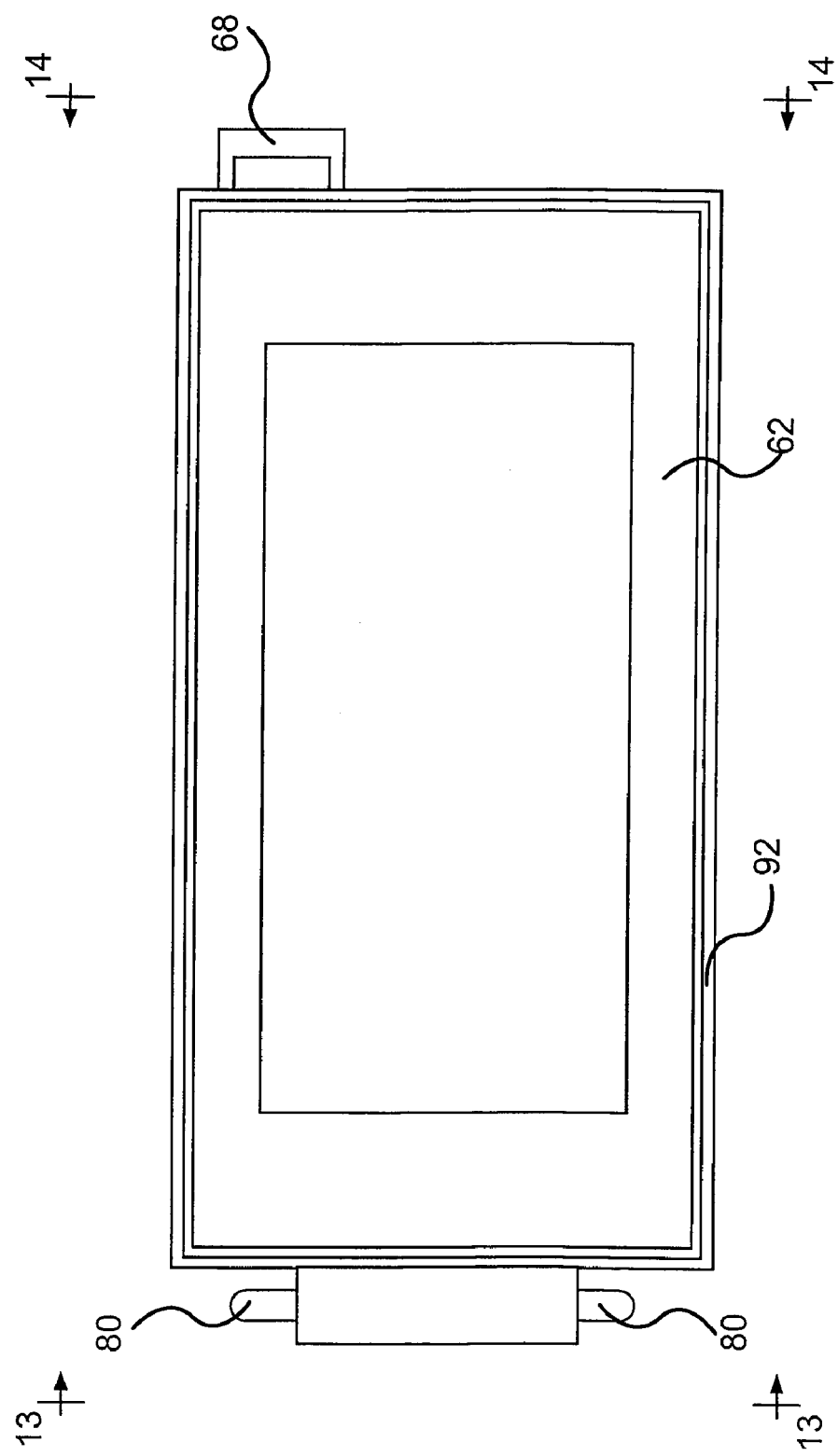
FIG. 12 is a view of the lid of FIG. 9 as seen along view lines 12-12 of FIG. 9.
Figure 13:
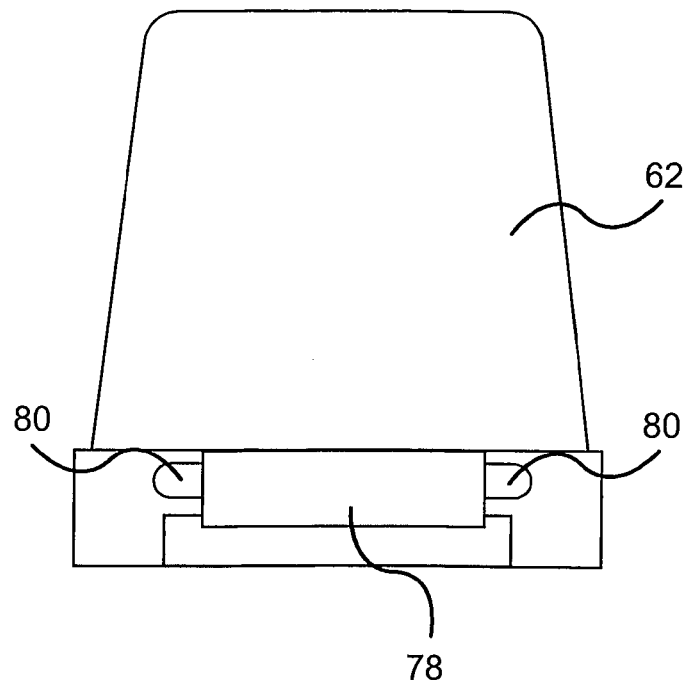
FIG. 13 is an end view of the base of FIG. 9 as seen along view lines 13-13 of FIG. 12.
Figure 14:
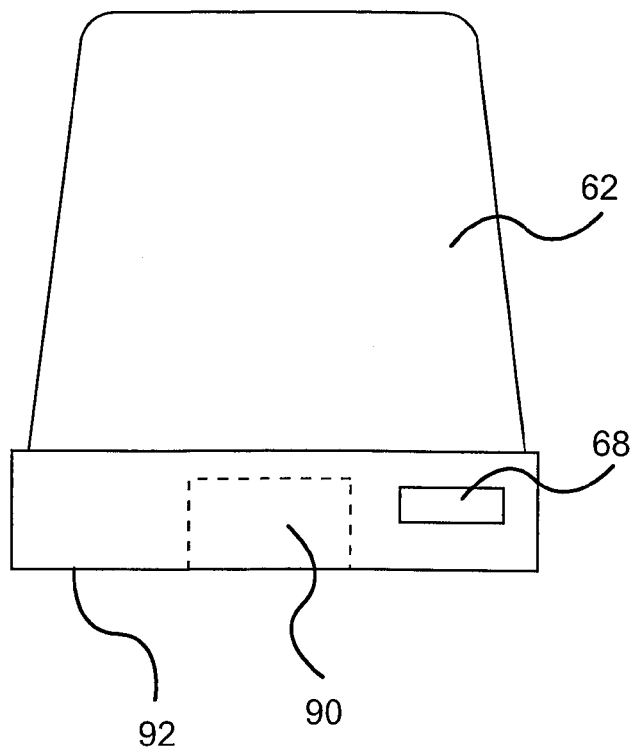
FIG. 14 is an end view of the base of FIG. 9 as seen along view lines 14-14 of FIG. 12.

As shown in FIGS. 14 and 15, embodiments of the invention may include a knock-out tab 90 and corresponding cord catch 84 on a second adjacent side of the lid 62 and base 64 of the cover plate 60 in addition to the knock-out tab 90 on a first side. By including knock-out tabs 90 and cord catches 84 on adjacent sides of the cover plate 60, the weatherproof nature of the cover plate 60 may be maintained in either the horizontal or vertical orientation of the cover plate 60 by removing a knock-out tab 90 on the underside of the cover plate 60 after the cover plate 60 is installed.

Figure 17:
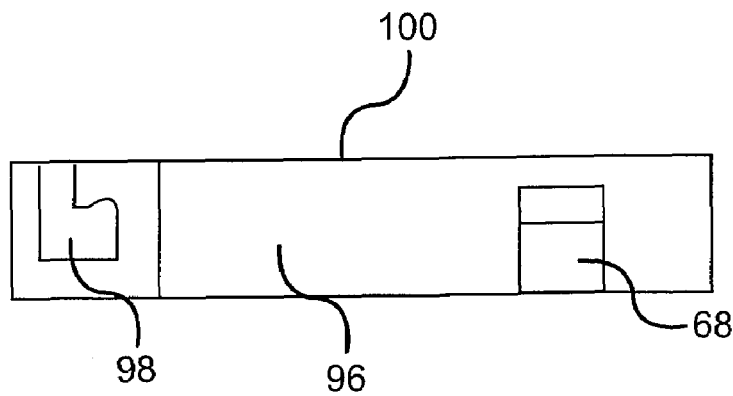
FIG. 17 is an end view of a base of a bubble cover plate with a flattened corner similar to the view of FIG. 15.
Figure 18:
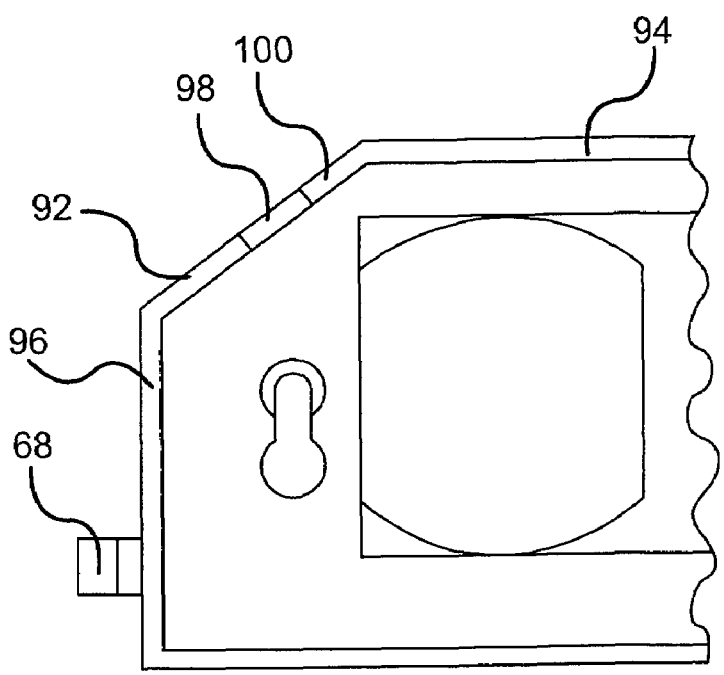
FIG. 18 is a top view of a portion of the base of FIG. 17.
Figure 19:
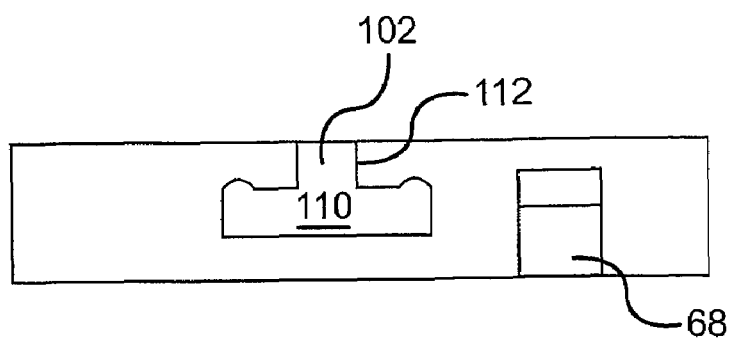
FIG. 19 is an end view of a base of a bubble cover plate similar to the view of FIG. 15, the base using a T-shaped cord catch.

Additional or alternative knock-out tabs and cord catches may be used in the base and lid to accommodate cord access to the closed cover plate from various locations or for multiple access points. For example, as illustrated in FIGS. 17 and 18, a base may be configured to have a flattened corner 92 adjoining two adjacent sides 94 and 96, the flattened corner 92 having a cord catch 98 disposed along a lip 100, or upper ridge, thereof. With the cord catch 98 on a flattened or other-shaped corner 92, the cover plate may be installed in either a horizontal or vertical orientation using a single cord catch opening. Alternatively, a differently shaped cord catch may be used to accommodate multiple cords, or merely provide more space for a single cord. For example, as shown in FIG. 19, a T-shaped cord catch 102 may be used and accommodate a cord in each branch of the T. Furthermore, similar to the cord catch 98 shown in FIG. 17, the cord catch may be a backwards J-shaped cord catch to assist in holding the cord in the catch. A particular orientation of the cord catch embodiments shown herein should not be implied by the Figures. Embodiments of the invention may include cord catches of varying orientations and shapes such as a forward and backward J shapes, forward and backward L, various wedge shapes, and U shapes.

Additionally, a cord catch of any embodiment of the invention may further include a knock-out section 110 therein which is integrally formed with the base but includes a thinned region 112 therearound, similar to knock-out sections 90 included in the lid 62. These cord catch knock-out sections 110 may then be used to provide additional protection until it is desired to pass a cord through the cord catch. The thinned region 112 allows for removal of the knock-out section 110 similar to the knock-out tabs 26 of the base shown in FIG. 4.

Figure 27:
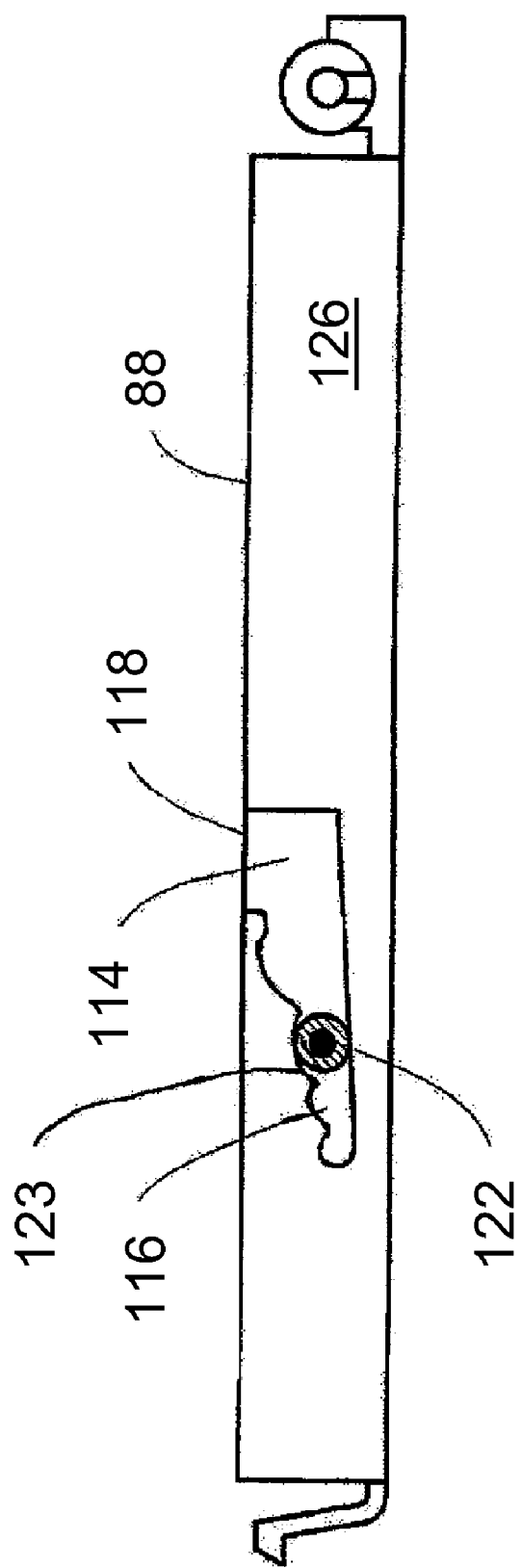
FIG. 27 is a side view of a third embodiment of a cord catch in a cover plate base.

In reference to FIGS. 21, 22, 27, 28A, 28B, and 28C, the cord catch 114 may alternatively be configured to have a narrowing portion 116, such as at an end, which operates to restrict movement of the cord 120 or 124 therethrough. In use, a cord 120 or 124 may be placed in the cord catch 114 through the opening 118 along the upper lip 88, or ridge of the base 126. By moving the cord 120 or 124 toward the narrowing portion 116 of the cord catch 114, the narrowing cord catch 114 will "pinch" the cord 120 or 124 in the cord catch 114 to restrict its movement. As illustrated in FIG. 27, the narrowing portion 116 of the cord catch 114 may have sides that include at least one curve 123. As illustrated, in particular implementations of a cord catch 114, the at least one curve 123 may gradually reduce the width of the narrowing portion 116 of the opening 118 of the cord catch 114. By providing a knock-out in the cover which aligns with the base when closed, such as that shown in FIG. 9 and described in reference thereto, the lid may be closed over the base 126 even when the cord 120 or 122 extends through the cord catch 114 in the implementations illustrated in FIGS. 21, 22, and 27. By using a narrowing portion 116 in the opening 118 of the cord catch 114, a plug associated with the cord which is plugged into an outlet within the bubble cover plate is more likely to remain plugged in because the narrowing end 116 of the cord catch 114 presses against the cord 120 or 122, thus increasing the friction between the cord 120 or 122 and the sides of the cord catch 114 to restrain the cord 120 or 122. Of course, for many embodiments it would be desirable to match the size and shape of the lid to that of the base and match corresponding knock-out tabs in the lid to cover any cord catches in the base to thereby reduce the likelihood of water gaining access to the electronics within the cover plate when the lid is closed on the base.

Figure 28A:
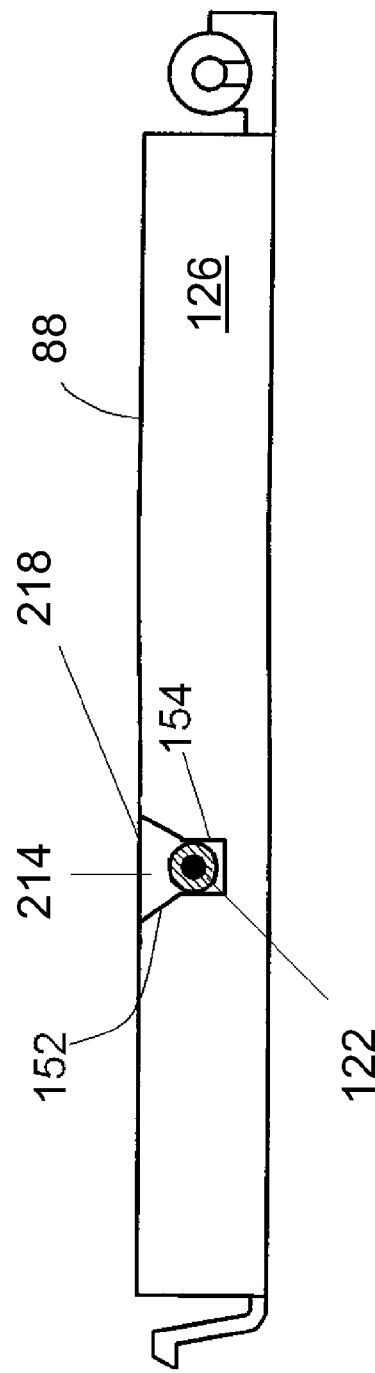
FIG. 28A is a side view of a fourth embodiment of a cord catch in a cover plate base.
Figure 28B:
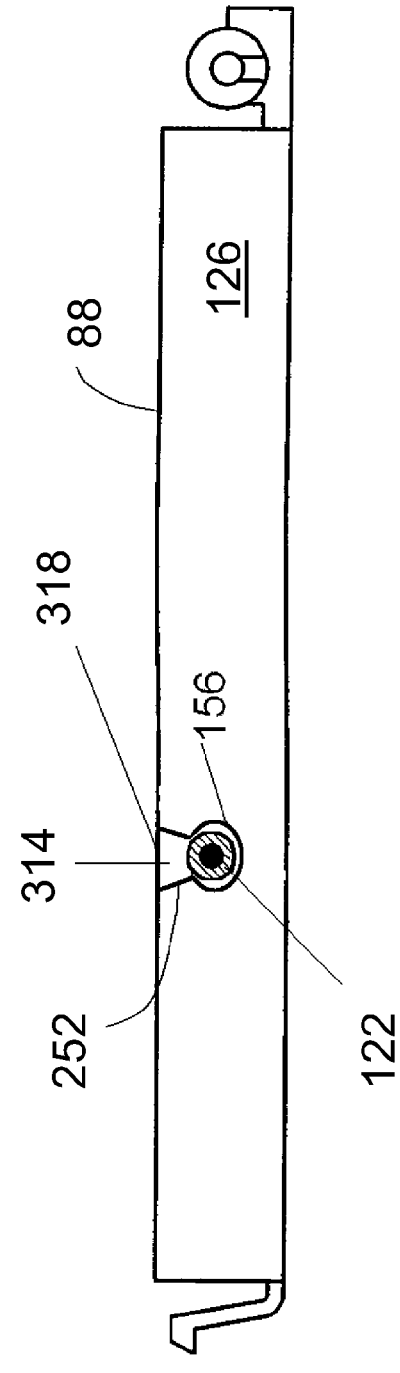
FIG. 28B is a side view of a fifth embodiment of a cord catch in a cover plate base.
Figure 28C:
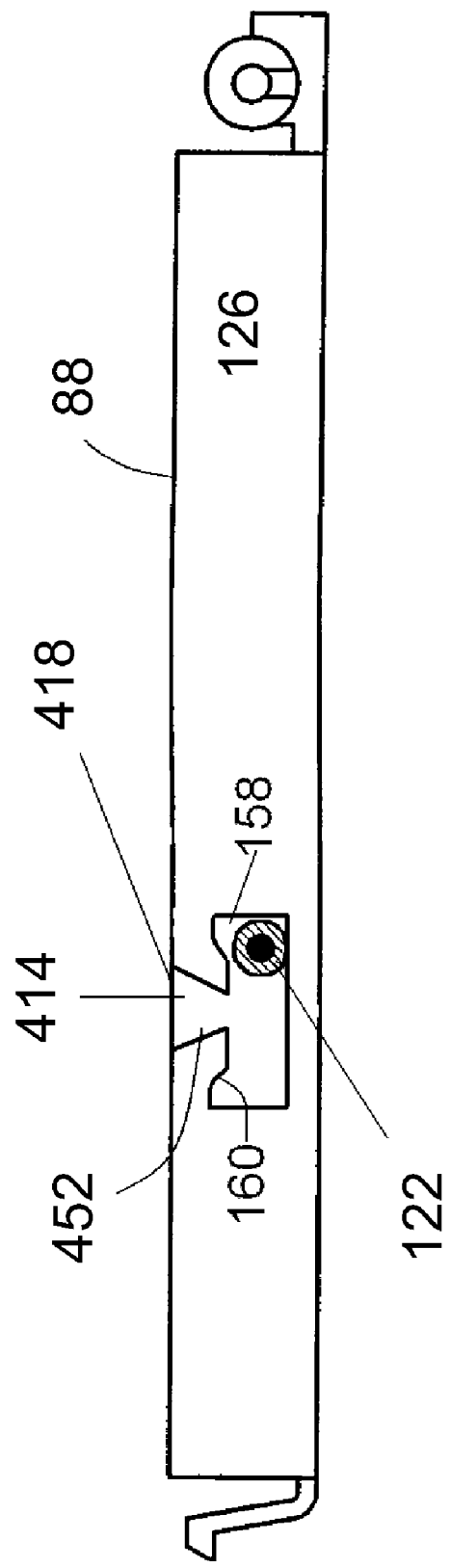
FIG. 28C is a side view of a sixth embodiment of a cord catch in a cover plate base.

In addition, referring to FIGS. 28A-C, the cord catch 214 may include an opening 218 with a first portion having at least one slanted edge 152 slanting toward the center of the opening. The opening 218 may also include a second portion 154. As illustrated in FIG. 28A, the second portion 154 may include at least three straight sides into which a cord 122 can be inserted. The second portion 154 may be dimensioned to enable a cord 122 of a particular size to be retained within the second portion 154. In other particular implementations, the second portion 154 may include stepped or angled sides that progressively narrow the second portion 154 to enable retention of cords of large to small thickness. Referring to FIG. 28B, particular implementations of a cord catch 314 may include an opening 318 that has at least one slanted edge 252 slanted toward the center of the opening. The opening 318 may also include a second portion 156. As illustrated, the second portion 156 may include at least one curve, and may be substantially circular. Referring to FIG. 28C, particular implementations of a cord catch 414 may include an opening 418 that has at least one slanted edge 452 and a second portion 158. The second portion 158 may also include at least a second reentrant opening 160 extending from an edge of the second portion. In the particular implementation illustrated in FIG. 28C, two curved reentrant openings 160 are present extending inward from the edges of the second portion 158 of the opening 418. Implementations utilizing reentrant openings, straight, stepped, curved, or angled sides may also include barbs or serrations extending from any edge of the first or second portions of the openings 218, 318, 418 to further aid in retaining a cord 122 inserted into the cord catches 214, 314, and 414.

Figure 23:
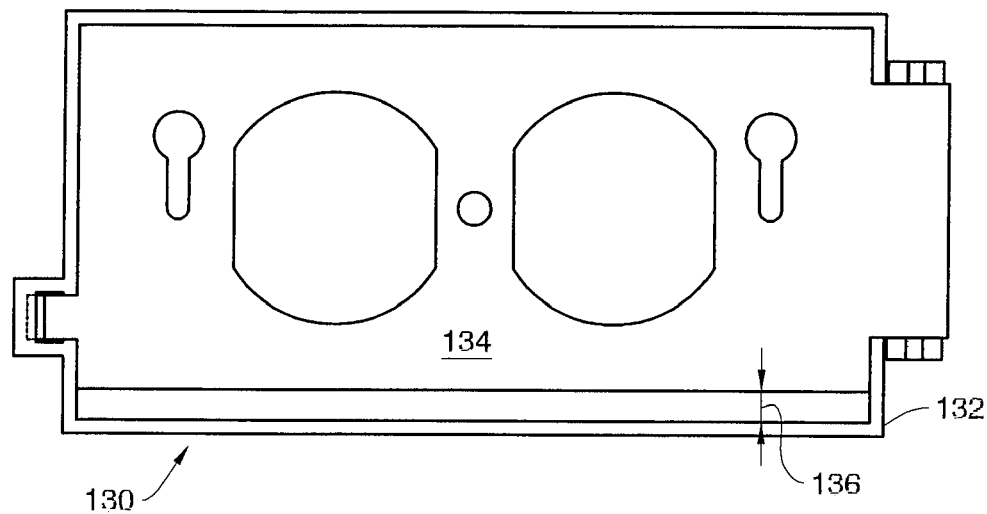
FIG. 23 is a bottom view of an assembled weatherproof bubble lid and base illustrating a first embodiment of a gap.
Figure 24:
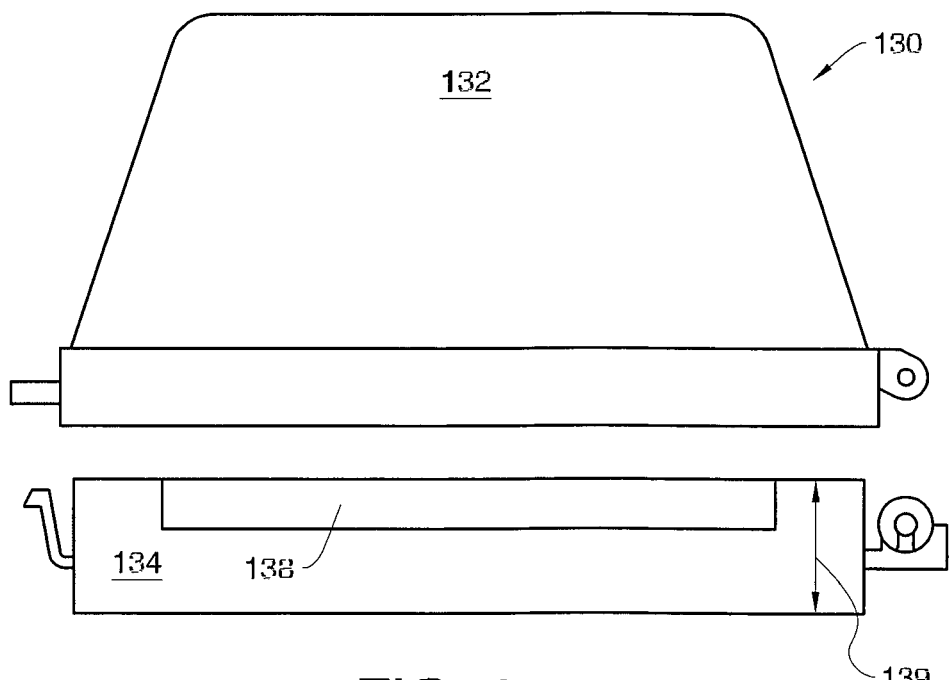
FIG. 24 is a side view of the weatherproof bubble lid and base of FIG. 23 in which the lid and base are separated to show a base opening.

In other embodiments of the invention, however, such as those shown in FIGS. 23-26, it may be desirable to match the size and shape of the lid to that of the base for a majority of the lid, but include a portion of the lid sized and shaped so that there is a gap between the lid and base large enough for a cord to extend therethrough. FIGS. 23 and 24 show, respectively, a bottom view of an assembled cover plate 130 and a side view of a disassembled cover plate 130 illustrating a gap 136 between the lid 132 and the base 134 sufficient to allow a cord to extend therebetween without interfering with the lid 132 closing. For the embodiment shown in FIGS. 23 and 24, the gap 136 extends for substantially the entire length of a side of the base 134, though shorter gaps are contemplated. The base 134 of the cover plate 130 for this embodiment includes an optional opening 138 in the base wall to allow a cord to more easily pass through the gap and recess without preventing the lid 132 from closing.

As with previous embodiments of the invention, the base opening 138 may include a knock-out which can be removed only when needed. It is anticipated that the gap 136 and base opening 138, if used, may be of any shape and size so long as it is sufficient to allow an electrical cord to pass therethrough. For embodiments without a base opening, the gap 136 between the lid 130 and the base 134 may be designed of a sufficient size to allow a cord to pass therethrough without preventing the lid 130 from closing. The base 134, may also be formed with a greater depth 139 to provide protection for the internal electronics while compensating for the opening 138 in the base ridge. Note that for the embodiment shown in FIG. 24, the lip of the lid 132 extends beyond the base opening 138 when the lid is closed to reflect water from the opening 138 while allowing a cord to extend through the opening 138.

Figure 25:
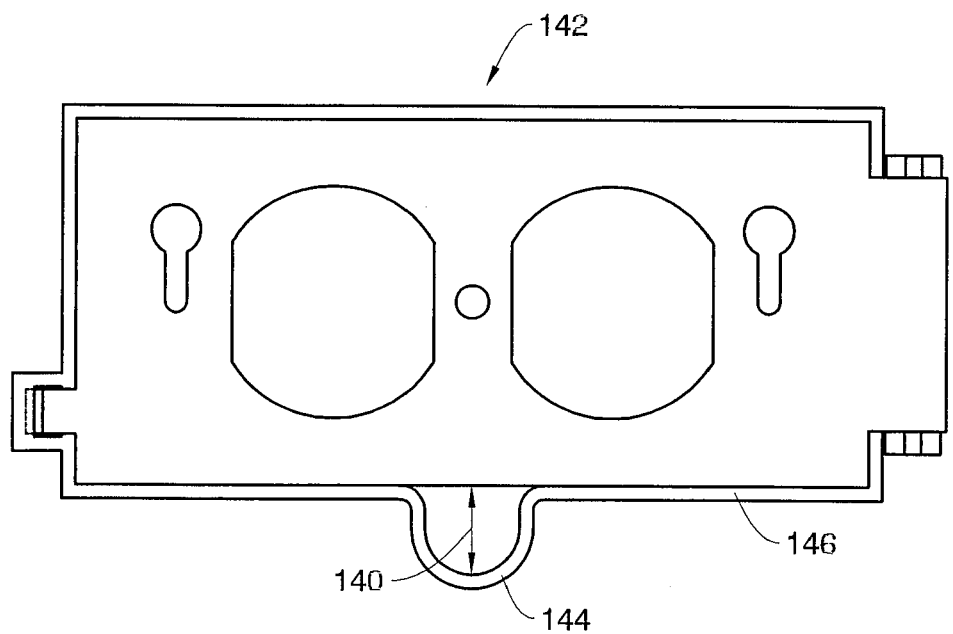
FIG. 25 is a bottom view of an assembled weatherproof bubble lid and base illustrating a second embodiment of a gap.
Figure 26:
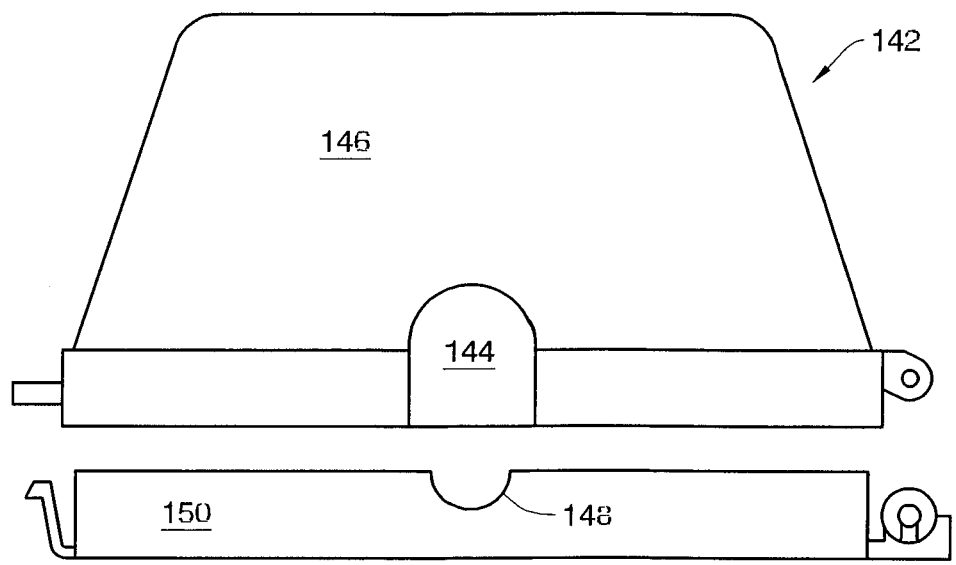
FIG. 26 is a side view of the weatherproof bubble lid and base of FIG. 25 in which the lid and base are separated to show a base opening.

FIGS. 25 and 26 show another embodiment of a cover plate having a gap between the lid and the base. The gap 140 of this embodiment, rather than extending for substantially the entire length of a side of the cover plate 142 as in the previous embodiment, extends for only a short portion of the side of the cover plate 142 so as to create a bulge 144 on a wall or along a ridge of the lid 146. The bulge 144, like the extended gap in the previous embodiment, may be sized and shaped to allow passage of a cord therethrough. The specific dimensions of either the gap or the bulge will depend upon the desired size of the intended cord to pass therethrough and may range from a size sufficient to pass a small cord, for example having a diameter of ⅛ to ¼ inch, to a size sufficient to pass a large cord, for example having a diameter of 1 to 1½ inch. Similar to the previous embodiment, the embodiment shown in FIGS. 25 and 26 includes an opening 148 in the ridge of the base 150 to provide some additional space for allowing a cord to pass through the gap 140. The opening 148, however, is optional because the gap 140, may be sized and shaped sufficiently without an opening in the base to allow a cord to pass therethrough when the lid 142 is closed. It is contemplated that more than one gap may be included on a side of the lid, and, if used, more than one corresponding base opening may be used to allow cords to more easily extend from the cover plate embodiments when installed in either the horizontal or vertical positions. The use of a gap is particularly useful in a weatherproof bubble cover plate because it allows a cord to extend therefrom while the lid is securely closed and fastened to keep the weather from the outlet enclosed therein.

Embodiments of the base opening for use with a gap may also include a cord catch, such as the cord catch examples shown in FIGS. 9, 17, 19, 21 and 22, 27, 28A, 28B, and 28C. In such an embodiment, the cord may be extended through the cord catch opening with the lid open. Thus, the cord catch may have an opening along the ridge around the base. Additionally, the ridge may have a lip that faces the lid and the cord catch may have a second portion that extends along the wall of the base, which portion does not have a direct exit to the edge of the base ridge. In other words, the second portion of the cord catch has a side, which is part of the base ridge, that does not have an immediate exit to the ridge opening that may extend substantially parallel to the lip on the ridge. Thus, a cord placed in the cord catch cannot be pulled directly perpendicular to the base from the cord catch, but may be moved in a direction substantially parallel to the base, toward either the top (hinged side) or bottom (latch side) end of the base, and then moved perpendicular to the base to reach the opening along the edge of the base ridge.

Alternatively, similar structures may be provided in the cover to catch the cord. This embodiment has the additional benefit of the cord holding the cover shut when the cord is in the cord catch. By having a specific cord catch rather than just a flat or rounded opening in the cover or base, the cord may be held within the cord catch to make it easier for the lid to close against the base. This is particularly useful in embodiments using a biased hinge because the cord is less likely to interfere with the lid being biased closed which enables the lid to completely close by itself. The use of the latch also helps to keep the lid closed while the cord is moved and pulled. Without the latch, though its use is optional, there is a greater likelihood that pulling on the cord will cause the lid to open, exposing the outlet to the weather, and the cord may become unplugged.

For any of the embodiments shown and described herein, additional gaskets may be used to increase the weatherproof characteristics of a bubble cover plate. For example, a gasket may be used between the base and the lid to further restrict water from entering a closed cover plate, a gasket may be positioned near the hinge area to prevent water from entering gaps along the hinge area, and a gasket may be provided in a cord catch to create a flexible seal around a cord passing therethrough.

The cover plate lids and bases for either the flat cover plate or bubble cover plate embodiments may be formed of metal, plastic or other material by well-known processes. Gaskets for cover plates may be formed of a resilient water resistant material such as foam, rubber, silicon and the like, and may be optionally adhered to the lid or other surface by any adhesive known in the art. The biasing members may be formed of a resilient material such as spring steel that may be formed into a shape and has properties for maintaining the shape or quickly returning to it when counter-biased.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A cover plate for an electrical outlet, the cover plate comprising:
   a base comprising an electrical device aperture therethrough, a box mounting screw aperture therethrough, and a ridge, the ridge comprising at least one cord catch and a lip; and
   a lid coupled to the base by a hinge;
   wherein the lip faces the lid, the cord catch comprises at least one opening in the ridge of the base wherein a portion of the at least one opening extends substantially parallel with the lip; and
   wherein the at least one opening comprises at least three sides and at least one of the at least three sides extends in a direction substantially parallel with the lip.

2. The cover plate of claim 1, wherein the at least one opening of the cord catch is J shaped or U shaped.

3. The cover plate of claim 1, wherein the portion of the at least one opening of the cord catch that extends substantially parallel with the lip comprises an edge and the edge comprises at least one curve, wherein the at least one curve in the edge narrows the portion of the at least one opening such that a cord inserted therein is restricted in its movement therethrough.

4. The cover plate of claim 1, wherein the base is adaptable to alternatively accommodate at least one of a single round electrical socket, a duplex electrical socket and a GFCI electrical socket.

5. The cover plate of claim 1, wherein the base comprises a plurality of knock-outs, and wherein the base is adaptable to accommodate at least one of a single round electrical socket, a duplex electrical socket and a GFCI electrical socket through removal of at least one of the knock-outs.

6. The coverplate of claim 1, wherein the cord catch further comprises at least one knock-out tab in the at least one opening in the ridge of the base.

7. The coverplate of claim 1, wherein the base further comprises an adapter plate, the adapter plate comprising at least one knock-out and wherein the adapter plate is adaptable to accommodate at least one of a single round electrical socket, a duplex electrical socket and a GFCI electrical socket through removal of at least one of the knock-outs.

8. A cover plate for an electrical outlet, the cover plate comprising:
   a base comprising an electrical device aperture therethrough, a box mounting screw aperture therethrough for mounting the base to an electrical outlet box, and a ridge, the ridge comprising at least one cord catch and a lip; and
   a lid coupled to the base by a hinge;
   wherein the lip faces the lid, the cord catch comprises at least one opening in the ridge of the base, and a portion of the at least one opening extends substantially parallel with the lip; and
   wherein the portion of the at least one opening comprises at least one side and the at least one side is configured to restrict movement of a cord in a direction substantially perpendicular to the lip when a cord is inserted into the cord catch.

9. The cover plate of claim 8, wherein the at least one opening of the cord catch is J shaped or U shaped.

10. The cover plate of claim 8, wherein at least one of the sides of the portion of the at least one opening comprises at least one curve, wherein the at least one curve in the side narrows the portion of the at least one opening such that a cord inserted therein is restricted in its movement therethrough.

11. The cover plate of claim 8, wherein the at least one side of the opening comprises at least three sides and at least one of the at least three sides extends in a direction substantially parallel with the lip.

12. The cover plate of claim 8, wherein the base is adaptable to alternatively accommodate at least one of a single round electrical socket, a duplex electrical socket and a GFCI electrical socket.

13. The cover plate of claim 8, wherein the base comprises a plurality of knock-outs, and wherein the base is adaptable to accommodate at least one of a single round electrical socket, a duplex electrical socket and a GFCI electrical socket through removal of at least one of the knock-outs.

14. The cover plate of claim 8, wherein the cord catch further comprises at least one knock-out tab in the at least one opening in the ridge of the base.

15. The cover plate of claim 8, wherein the base further comprises an adapter plate, the adapter plate comprising at least one knock-out and wherein the adapter plate is adaptable to accommodate at least one of a single round electrical socket, a duplex electrical socket and a GFCI electrical socket through removal of at least one of the knock-outs.

16. A cord catch for a cover plate for an electrical outlet, the cord catch comprising:
  at least one opening in a ridge of a base, the ridge comprising a lip, the base coupled to a lid by a hinge and the lip facing the lid; and
  wherein the base comprises an electrical device aperture therethrough and a box mounting screw aperture therethrough for mounting the base to an electrical outlet box; and
  wherein the at least one opening comprises a first portion comprising at least one slanted edge and a second portion, the second portion extending from the at least one slanted edge of the first portion.

17. The cover plate of claim 16, wherein the second portion of the at least one opening in the lip comprises at least three straight sides.

18. The cover plate of claim 17, wherein at least one of the three straight sides comprises at least one step configured to narrow the second portion of the at least one opening in the lip.

19. The cover plate of claim 16, wherein the second portion of the at least one opening in the lip comprises at least one curve.

20. The cover plate of claim 16, wherein the second portion of the at least one opening in the lip comprises at least a second reentrant opening extending from an edge of the second portion of the at least one opening in the lip.

21. The cover plate of claim 16, wherein the at least one opening in the lip comprises at least one barb and/or serration extending from an edge of the at least one opening in the lip.

22. A cover plate for an electrical outlet, the cover plate comprising:
  a base comprising an electrical device aperture therethrough, a box mounting screw aperture therethrough, and a ridge, the ridge comprising at least one cord catch and a lip; and
  a lid coupled to the base by a hinge;
  wherein the lip faces the lid, the cord catch comprises at least one opening in the ridge of the base wherein a portion of the at least one opening extends substantially parallel with the lip; and
  wherein the portion of the at least one opening of the cord catch that extends substantially parallel with the lip comprises an edge and the edge comprises at least one curve, wherein the at least one curve in the edge narrows the portion of the at least one opening such that a cord inserted therein is restricted in its movement therethrough.

* * * * *